United States Patent [19]

Wurster et al.

[11] Patent Number: 4,888,746

[45] Date of Patent: Dec. 19, 1989

[54] FOCUSSING ULTRASOUND TRANSDUCER

[75] Inventors: Helmut Wurster, Oberderdingen; Werner Krauss, Maulbronn, both of Fed. Rep. of Germany

[73] Assignee: Richard Wolf GmbH, Knittlingen, Fed. Rep. of Germany

[21] Appl. No.: 244,714

[22] Filed: Sep. 14, 1988

[30] Foreign Application Priority Data

Sep. 24, 1987 [DE] Fed. Rep. of Germany ....... 3732131

[51] Int. Cl.$^4$ .............................................. H04B 1/02

[52] U.S. Cl. ................................ 367/138; 128/24 A; 128/660.08; 128/660.01; 367/153

[58] Field of Search ............... 367/153, 155, 157, 165, 367/150, 138; 128/24 A, 663.01, 660.08, 660.01, 662.03, 661.05, 661.06, 661.01; 73/642; 310/334, 335

[56] References Cited

U.S. PATENT DOCUMENTS

| | | | |
|---|---|---|---|
| 2,645,727 | 7/1953 | Willard | 310/361 |
| 4,012,952 | 3/1977 | Dory | 73/660 |
| 4,103,677 | 8/1978 | Lansiart et al. | 128/661.01 |
| 4,112,411 | 9/1978 | Alais et al. | 367/135 |
| 4,119,938 | 10/1978 | Alais | 367/87 |
| 4,155,259 | 5/1979 | Engeler | 73/626 |
| 4,156,863 | 5/1979 | Madison et al. | 367/165 |
| 4,159,462 | 6/1979 | Rocha et al. | 367/97 |
| 4,183,249 | 1/1980 | Anderson | 73/642 |
| 4,241,611 | 12/1980 | Specht et al. | 73/626 |
| 4,270,546 | 6/1981 | Perilhou et al. | 128/660.07 |
| 4,281,550 | 8/1981 | Erikson | 128/663.01 |
| 4,307,613 | 12/1981 | Fox | 73/626 |
| 4,455,872 | 6/1984 | Kossoff et al. | 73/618 |
| 4,457,177 | 7/1984 | Van Heelsbergen | 73/626 |
| 4,471,785 | 9/1984 | Wilson et al. | 128/661.01 |
| 4,487,073 | 12/1984 | Sumino | 73/626 |
| 4,526,168 | 7/1985 | Hassler et al. | 128/24 A |
| 4,534,221 | 8/1985 | Fife et al. | 73/642 |
| 4,537,074 | 8/1985 | Dietz | 73/625 |
| 4,541,435 | 9/1985 | Saito et al. | 128/660.07 |
| 4,570,488 | 2/1986 | Miwa et al. | 73/626 |
| 4,582,065 | 4/1986 | Adams | 310/335 |
| 4,617,931 | 10/1986 | Dory | 128/328 |
| 4,622,972 | 11/1986 | Giebeler | 128/24 A |
| 4,651,850 | 3/1987 | Matsuo | 367/153 |
| 4,725,989 | 2/1988 | Granz et al. | 128/24 A |
| 4,771,787 | 9/1988 | Wurster et al. | 128/24 A |
| 4,787,394 | 11/1988 | Ogura | 128/660.03 |

OTHER PUBLICATIONS

C. R. Hill, "Ultrasonic Imaging," *Journal of Physics & Scientific Instruments*, vol. 9, Mar. 1976.

*Primary Examiner*—Charles T. Jordan
*Assistant Examiner*—J. Woodrow Eldred
*Attorney, Agent, or Firm*—Willian Brinks Olds Hofer Gilson & Lione

[57] ABSTRACT

A focussing transducer for the destruction of objects internal to a patient's body by pulses of ultrasonic waves. The transducer comprises a concave transducer surface which is divided into areas and there is a control means which can selectively activate the areas of the transducer so that the waveform arriving at the focus can adjusted.

16 Claims, 3 Drawing Sheets

FOCUSSING ULTRASOUND TRANSDUCER

BACKGROUND OF THE INVENTION (a) Field of the Invention

The invention relates to a focussing transducer for generating ultrasound pulses for the destruction of objects internal to the body, such as concretions and tissue sections, of the kind comprising a spheroidal cup having a mosaic of piezoelectric transducer elements forming the concave surface of the cup, which piezoelectric elements may be energised into oscillation by means of a control apparatus, the transducer having its focus lying on the transducer axis and being alignable on the object in question, and the ultrasound pulses generated being transmissible to the patient's body via a coupling fluid.

(b) Description of the Prior Art

Direct-focussing ultrasound transducers of this kind are known. The DE-A1 27 12 341 discloses an ultrasound transducer of piezoelectric material which is appropriate for examinations by ultrasound in medical diagnostics, in which the transducer body has a concave curvature so that acoustic focussing of the sound waves may be obtained in this manner at a fixed focal point which is determined by the curvature of the transducer. Ring electrodes oppositely situated to an electrode extending throughout the active surface and concentrically applied around a central electrode are situated on the outer surface of the transducer body. The setting of the focal point on the axis of the transducer may be varied to the effect of shortening or lengthening the acoustic focal length, predetermined by the geometrical structure, by energisation of the ring electrodes under variable time-lagging, that is to say up to infinity.

A system organised for the destruction of concretions present in body cavities, of analogous structure to that of the system described in the foregoing, is disclosed, furthermore, in the DE-A1 31 19 295. The characterising feature of this system is a focussing ultrasound transducer which is constructed as a direct sound applicator and with so large an area that the sound output density is so small on the transmission path that tissue damage is prevented, but so great at the acoustic focus that it is adequate for destruction of the concretion present at the focus. In this case too, the division of the transducer surface into rings or matrically assembled individual transducers, serves the purpose to enable the transducer focus to be variably adjustable electronically, according to the phased-array principle.

It is then in the nature of the pulse generation by means of the transducers described that a positive pressure pulse is commonly followed by a negative pulse of greater or lesser magnitude. In this connection, cavitational actions may occur in the negative pressure stage which may have a positive effect in the form of an accelerated destruction, provided this occurs directly in the region of the concretion which is to be destroyed. If however, the cavitational threshold in the interposed tissues or in the adjacent tissues is exceeded during a concretion destroying action, this may lead to undesirable tissue destruction and haemorrhages, especially if the focal point of the transducer is not focussed precisely on the concretion.

As apparent for example from the DE-A1 34 25 992, the aim has already been pursued in the case of lithotripsy, to prevent the appearance of negative pressure pulses or at least reduce the same so far that cavitational actions may be prevented. The steps taken to this end are applicable to a special mechanical structure of the transducer which is intended to ensure that the surge impedance of the material forming the carrying cap for the transducer elements largely corresponds to that of the transducer elements and that the rearward cap surface has no focussing action. Thanks to the absence of reflection established thereby, the deformations of the transducer elements may follow the electrically preset pulse form. Measures of this nature render a transducer so devised particularly appropriate for the destruction of concretions, but they cannot be applied for an aimed or precision destruction of tissue cells, for example in cancer therapy.

The main object of the present invention is to provide an ultrasound transducer which is appropriate for the destruction of concretions as well as of tissue cells and which renders it possible to generate the sound pulses practically at will as regards their amplitude, phase setting, polarity, form and duration.

SUMMARY OF THE INVENTION

To this end, the present invention relates to a focussing transducer for generating ultrasound pulses for the destruction of objects internal to the body, such as concretions and tissue sections, comprising a spheroidal cup having a mosaic of piezoelectric elements forming the concave surface of the cup, which piezoelectric elements may be energised into oscillation by means of a control apparatus, the transducer having its focus lying on the transducer axis and being alignable on the object in question, and the ultrasound pulses being transmissible to the patient's body via a coupling fluid, characterized in that the active transducer surface is subdivided into several areas aligned on the transducer focus, each of which has allocated to it a selected number of transducer elements and that the transducer areas may be energised by means of the control means in optional manner serially and/or in parallel, singly, in groups and as a whole, to generate at least one sound pulse.

To this end, the transducer areas may extend around the transducer axis in the form of concentric angular elements, or assume the form of spheroidal sectors, but they may also have a shape which is characterised by a combination of the aforesaid transducer forms.

This provides the possibility of energising each transducer area singly or in groups in freely selectible manner, that is to say serially and/or in parallel as well as negatively and positively as regards phase and amplitude. Furthermore, the shape of the sound "club" generated may be affected by appropriate circuitry controlling the transducer elements or transducer areas, so that it may for example have an oval or elliptical cross-section, if for example, several transducer areas situated at the edge of the transducer surface are not energised. Amongst others, this has the advantage that the sonic club or fist may be adapted to anatomical conditions which is of importance in the case in which the patient's ribs were to restrict the sound window on a concretion present in the kidney.

The amplitude and/or the duration and/or the polarity of the sound pulse effective as a whole at the transducer focus may moreover be adjusted by serial energisation of transducer areas and by superimposition of the resulting sound pulses in the focal area.

A precise application of the transducer according to the invention as an instrument for the destruction of concretions is possible by particular circuit connection and energisation of transducer elements, in such manner that the negative halfwaves of the sound waves generated at the active transducer surface by momentary reverse oscillation of the transducer areas energised in each case may be balanced by an energisation in phase opposition of other transducer elements, meaning that a positive pressure surge only will substantially be generated at the focal point.

In the same way, the application of the transducer especially as an instrument for the destruction of tissue sections is possible by the fact that the positive halfwaves of the sound pulses generated at the active surface of the transducer elements operated in each case by momentary outward oscillation may be balanced at the focal point by an energisation in phase opposition of other transducer elements. Finally, the possibility is also provided of increasing and adjusting the amplitudes of positive and negative halfwaves of the sound pulses, by performing an equiphasal energisation of several or all transducer areas.

The variable control circuitry and energisation of the transducer areas thus renders it possible, for example, to make use of a part only of the transducer areas to generate the sound pulse, and to utilise the residual transducer areas for a reverse energisation and neutralisation of undesirable pulse portions. As has already been stated furthermore, all the transducer areas may be energised in parallel and driven by different pulse shapes at different times according to requirements, to which end a special form of embodiment may consist in that not only single pulses are generated but for example also a damped oscillation which is adapted to the oscillation buildup behaviour of the transducer. Finally, the transducer areas situated in the region of the marginal portions of the transducer may be energised with a lesser or greater amplitude than the other transducer areas, to obtain a sound pulse shape of particular effectiveness in this manner.

BRIEF DESCRIPTION OF THE DRAWINGS

In order that the invention may be more readily understood, an embodiment thereof will now be described, by way of example, with reference to the accompanying drawings, in which.

DESCRIPTION OF THE PREFERRED EMBODIMENT

Figure 1:
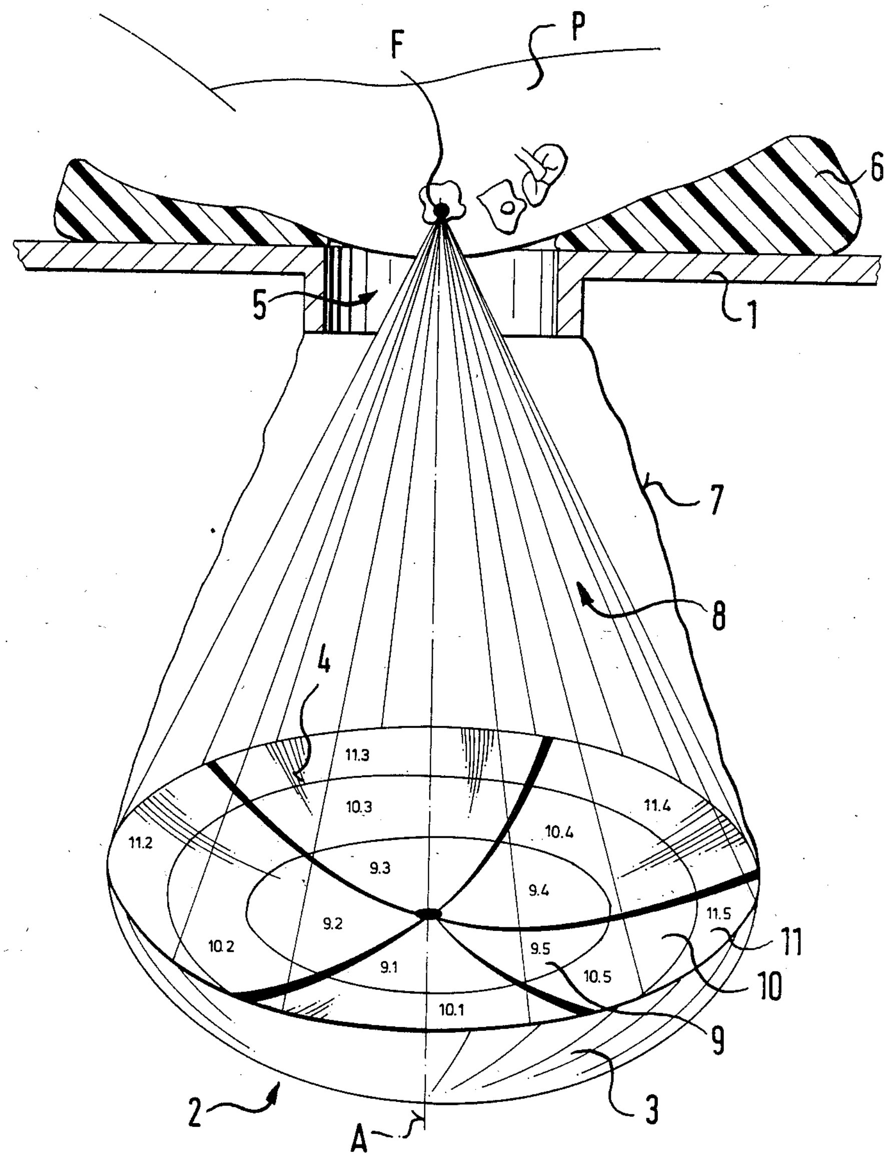
FIG. 1 shows a transducer diagrammatically in partial section and in axonometric form of illustration.

Referring now to FIG. 1 of the drawings, there is shown a piezoelectric ultrasound transducer 2 in the form of a spheroidal cup 3 disposed beneath a reclining surface 1 receiving a patient P. The transducer axis is designated by the reference character A, with the focal point F of the transducer also lying on the axis A. The emitting surfaces of the transducer elements are fixedly aligned on this focal point.

The concave transducer surface 4 is directed at an aperture 5 situated in the reclining surface 1. This aperture 5 is encircled by a sealing collar 6 which molds itself to the patient's body and ensures an hermetic seal of the aperture 5 with respect to that part of the patient's body which is scheduled for therapy.

The spheroidal cup 3 is surrounded by a bellows 7 which, because of its connection to the underside of the reclining surface 1 in the region of the vicinity of the aperture 51 forms a container 8 together with the surface 4 of the spheroidal cup 3 as a base. The elasticity of the bellows 7 allows of a displacement of the spheroidal cap 3 in three planes, which may be performed in a known manner by means of a spatial displacement table which is not shown as it does not form part of this invention. For the purpose of coupling the shock waves emitted from the spheroidal cup 3 to the patient, the container 8 is filed with water which is degassed and heated to body temperature.

The concave surface 4 of the spheroidal cup 3 is studded with piezoelectric transducer elements. Their arrangement is so made that, for example, the result consists in a structure of concentrically applied spheroidal annular elements 10 and 11 which are positioned around central cup segments 9, the whole transducer surface 4 being divided by separating gaps extending concentrically and radially, into individual electrically and mechanically isolated annular elements 10.1 to 10.5 and 11.1 to 11.5, and cup segments 9.1 to 9.5, respectively.

Figure 2:
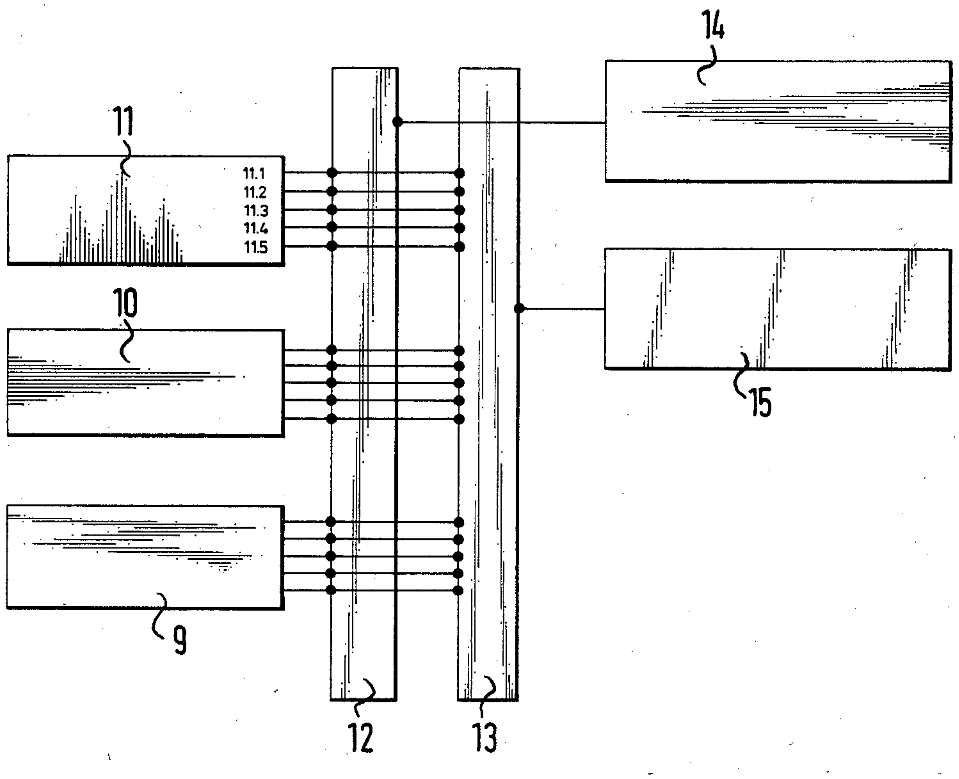
FIG. 2 shows the energising circuit for the transducer of FIG. 1 as a block circuit diagram.

The active surfaces of the annular elements 10, 11 and of the cup element 9 are electrically connected to an energising circuit which is shown in FIG. 2, in which the annular elements 10 and 11 and the cup segments 9 have been illustrated in simplified manner in the form of block symbols. The electrical voltage energising the ultrasound transducer 2 is applied between these connections and a common areal electrode on the rear side of the transducer elements or areas. To this end, the selection of the transducer elements or areas which are to be energised, the preselection of the monentary pulse intensity and polarity, as well as their chronological application, are performed in each case by means of a multiplexer 12 for a positive pulse forming action and a multiplexer 13 for a negative pulse forming action. The different polarity is provided, to this end, by appropriate pulse generators 14 and 15.

Figure 3:
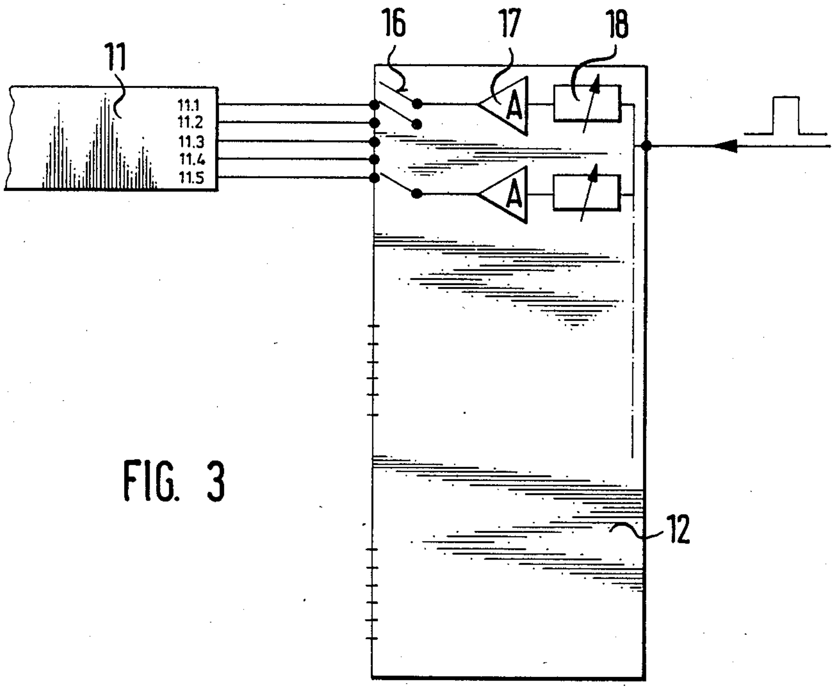
FIG. 3 shows the circuit diagram of a multiplexer used in the circuit of FIG. 2, in a simplified form of illustration.

The structure of the multiplexers 12 and 13 will be better appreciated from FIG. 3 which to provide a clearer view, merely shows the circuits for the energisation of the annular elements 11. Each circuit accordingly has a selector switch 16, an adjustable amplifier 17 for setting the momentary amplitude of the pulse, and a timing element 18 for setting the instant of energisation, so that each transducer area 11.1 to 11.5 may be energised singly or jointly with others.

For example, it is thus possible initially to energise some transducer elements or areas with a positive pulse, and then to energise other transducer areas with a negative pulse under consideration of the oscillation buildup behaviour of the transducer elements for the purpose of reverse energisation, so that a positive pressure surge only will occur at the focus F. Moreover, all the transducer elements my be connected in parallel and energised by means of different pulse forms, in which connection it is also possible to adjust the pulse generators 14 and 15 so that a damped oscillation adapted to the oscillation behaviour of the transducer may be generated for example, instead of a single pulse.

It is evidently also possible to energise the annular elements 10, 11 with a lesser amplitude than the cup segments 9. Finally, it is also possible in each case to energise the ultrasound transducer 2 for emission of a damped oscillation with the pulse which the transducer is just set to generate, whereby the amplitude of this pulse may be increased. No single pulse is obtained by doing so, but a pulse sequence in which however the negative or positive portion may in each case be increased compared to the other. A pulse sequence of this nature could be useful in particular in the destruction of tissues.

The individual transducer areas 9, 10 and 11 may well be formed as monolithic piezoelectric oscillators, but this will commonly result in a limitation on the available sonic output. If higher outputs are required, the transducer and thus also the transducer areas, will be built up from transducer elements assembled as a mosaic, for this purpose. Furthermore, all the transducer areas may be formed wholly by annular elements or spherical cup sectors. Finally, it is also possible to have other subdivisions of the whole active surface of the transducer as areas of different configuration.

Although a particular embodiment of the invention has been described, it should be appreciated that the invention is not restricted thereto but includes all modifications and variations falling within its scope.

What is claimed is:

1. In a focussing transducer for generating ultrasound pulses for the destruction of objects internal to the patient's body, which comprises a spheroidal cup having a mosaic of piezoelectric transducer elements forming the concave surface of the cup, which piezoelectric elements may be energised into oscillation by means of a control apparatus to generate ultrasound pulses having a waveform, the transducer having its focus located on the transducer axis and being alignable on an object, and the ultrasound pulses generated being transmissible to the patient's body via a coupling fluid, the improvement which comprises:

an active transducer surface which is subdivided into several areas which are each aligned on a transducer focus, and which each have a selected number of transducer elements allocated to them, and means for adjusting the waveform of the ultrasound pulses, comprising means for optionally energising the transducer areas serially, in parallel, singly, in groups, and all together in order to adjust the waveform of the ultrasound pulses, said optionally energising means operative to energize the transducer areas in a manner adapted to destroy objects internal to the patient's body.

2. A transducer according to claim 1, wherein the transducer areas have the form of annular elements which extend around the transducer axis.

3. A transducer according to claim 1, wherein the transducers have the form of sectors of spheroidal areas.

4. A transducer according to claim 1, wherein the transducers have a combination of forms including annular elements which extend around the transducer axis and sectors of spheroidal areas.

5. A transducer according to claim 1, wherein the control means operates to adjust at least one of the amplitude, the duration, and the polarity of the sound pulse acting as a whole in the transducer focus, by serial energisation of transducer areas and by superimposition of the sound pulses generated by the transducer areas in the region of the focus.

6. A transducer according to claim 1, for the destruction of objects in the form of concretions, wherein the control means is adjusted to balance negative halfwaves of the sound pulses generated by reverse oscillation at the focus by means of energisation in phase opposition of other transducer elements.

7. A transducer according to claim 1, for the destruction of objects in the form of tissue sections, wherein the control means is adjusted to balance positive halfwaves of the sound pulses generated at the focus in each case by outward oscillation of transducer elements by means of energisation in phase opposition of other transducer elements.

8. A transducer according to claim 1, wherein the control means is adjusted to increase the amplitudes of positive and negative halfwaves of the sound pulses by equiphasal energisation.

9. In a focussing transducer for generating ultrasound pulses for the destruction of objects internal to a patient's body, wherein the transducer comprises a spheroidal cup having a mosaic of piezoelectric transducer elements forming a concave area of the cup and operative to generate ultrasound pulses having a waveform, the transducer having its focus located on a transducer axis and being alignable on an object, the improvement comprising:

an active transducer surface on said concave area, said transducer surface subdivided into a plurality of areas, each aligned with the transducer focus and each associated with a respective subset of the transducer elements; and control means, coupled to the transducer element subsets, for adjusting the waveform of the ultrasound pulses by transmitting adjustable energisation pulses to the transducer elements subsets, said control means comprising:

a plurality of switches, each associated with a respective transducer element subset, for selectively transmitting and blocking transmission of energisation pulses to the associated subset;

a plurality of amplifiers, each associated with a respective transducer element subset, for amplifying energisation pulses transmitted to the associated subset by an individually variable amplification factor; and a plurality of delay devices, each associated with a respective transducer element subset, for delaying energisation pulses transmitted to the associated subset by an individually variable time delay;

at least some of said energisation pulses operative to energize the transducer elements in a manner adapted to destroy objects internal to the patient's body.

10. A transducer according to claim 9 wherein at least some of the areas are annular in shape extending partially around the transducer axis.

11. A transducer according to claim 9 wherein at least some of the areas are shaped as spheroidal sectors.

12. A transducer according to claim 10 wherein additional ones of the areas are shaped as spheroidal sectors.

13. A transducer according to claim 9 wherein the control means operates to adjust the amplitude, duration and polarity of the sound pulse generated by the transducer at the transducer focus by serial energisation of the transducer element subsets and by superimposition of the sound pulses generated by the transducer element subsets at the focus.

14. A transducer according to claim 9 wherein the control means is adjusted to cause at least one selected subset to be energised in phase opposition to at least one other selected subset to reduce the amplitude of negative pressures generated at the focus by negative halfwaves of sound pulses generated by the at least one other selected subset.

15. A transducer according to claim 9 wherein the control means is adjusted to cause at least one selected subset to be energised in phase opposition to at least one other selected subset to reduce the amplitude of positive pressures generated at the focus by positive halfwaves of sound pulses generated by the at least one other selected subset.

16. A transducer according to claim 9 wherein the control means is adjusted to energise the areas equiphasally to increase the amplitudes of both positive and negative halfwaves of sound pulses at the focus.

* * * * *